United States Patent
Wentzell

Patent Number: 5,760,103
Date of Patent: Jun. 2, 1998

[54] COPPER MARINE CLADDING COMPOSITION

[75] Inventor: Joseph M. Wentzell, 3302 Seagrape Dr., Ruskin, Fla. 33570

[73] Assignees: Joseph M. Wentzell, Ruskin, Fla.; Richard J. Spera, Northport, N.Y.

[21] Appl. No.: 113,962

[22] Filed: Aug. 3, 1993

Related U.S. Application Data

[63] Continuation of Ser. No. 601,808, filed as PCT/US89/05574, Mar. 14, 1991 published as WO90/06968, JUN. 28, 1990, abandoned.

[51] Int. Cl.[6] .................................................. C08L 63/00
[52] U.S. Cl. ..................... 523/122; 523/428; 523/433; 523/458; 523/466
[58] Field of Search ................................ 523/122, 428, 523/458, 466, 433

[56] References Cited

U.S. PATENT DOCUMENTS

| | | | |
|---|---|---|---|
| 4,197,233 | 4/1980 | Marshall | 260/37 EP |
| 4,247,594 | 1/1981 | Shea et al. | 428/328 |
| 4,609,692 | 9/1986 | Huybrechts et al. | 523/439 |
| 4,705,647 | 11/1987 | Yamaguchi et al. | 252/512 |

*Primary Examiner*—Helen Lee
*Attorney, Agent, or Firm*—Gregory J. Gore

[57] ABSTRACT

A marine cladding composition comprising in combination:
a. Copper powder
b. Two epoxy resins
   1. Bisphenol A epoxy resin and
   2. Polyglycol di-epoxide
c. Glass fibers
d. Polydimethyl siloxane
e. Two amine curing agents
   1. A polyammido amine and
   2. An aliphatic amine

3 Claims, No Drawings

COPPER MARINE CLADDING COMPOSITION

This is a continuation of application(s) Ser. No. 07/601,808 filed as PCT/US89/05574, Mar. 14, 1991, published as WO90/06968, Jun. 28, 1990, now abandoned.

TECHNICAL FIELD

The difficulties encountered in fouling surfaces that are submerged in sea water, and maintained them free of marine growth are well known. Numerous techniques have been devised or proposed to retard or prevent fouling of the surfaces exposed to marine environments. Many approaches suggested have involved the use of toxic materials, many of which are being banned because of environmental considerations. The problem to the boat owner is a substantial one because it is common practice to haul pleasure boats once a year to renew the bottom paint surface.

BACKGROUND ART

U.S. Pat. No. 4,410,642 discloses the use of copper with resins for marine coating compositions. U.S. Pat. No. 3,801,534 discloses bisphenol A epoxy resins and cures in anti-fouling coating compositions. U.S. Pat. No. 4,344,875 discloses diglycidyl ether of bisphenol A epoxy resin with organotin compounds in anti-fouling coating compositions. None disclose, however, the detailed copper compositions of this invention which provide surprisingly superior results.

DISCLOSURE OF INVENTION

In accordance with this invention there is provided a specific cladding composition comprising in combination:
a. Copper powder
b. Two epoxy resins:
 1. Bisphenol A epoxy resin and
 2. Polyglycol di-Epoxide
c. Glass fibers
d. Polydimethyl siloxane
e. Amine curing agents:
 1. A polyamido amine and
 2. An aliphatic amine The compositions of this invention in addition to being free of environmental problems have other marked advantages. Once applied as directed they last for years. The formulation results in a hard, non-ablative surface which gives long life to the finish unlike anti-fouling paints which are designed to ablate to renew the finish and must therefore be reapplied frequently.

It is known that barnacles do not grow on copper. However, cladding with copper has had distinct disadvantages because it is a highly noble, conductive element and therefore subjects other metals used in the construction of marine structures to galvanic corrosion. This invention overcomes that problem.

BEST MODE FOR CARRYING OUT THE INVENTION

The copper is utilized in a fine powder of a mesh size of about 100 to 325. It is employed in an amount of about 45 to 80% parts by weight of the total composition.

A bisphenol A epoxy resin composition is of the type, known in the art, formed by the reaction of epichlorohydrin with a polyol, such as 4,4' isopropylidenediphenol (bisphenol A). Preferably the epoxy resins are normally liquid compounds or low molecular weight solid compositions that are soluble in oxygenated aliphatic solvents such as ketones, esters, and ether alcohols or aromatic solvents such as xylene. The epoxy resin compositions desirably have molecular weights varying from about 340 to less than 8,000, preferably between about 340 and 3,000. This resin is employed in an amount of about 9 to 15%.

The polyglycol di-epoxide is well known in the art. The resin is employed in an amount of about 4–8%.

The glass fibers employed preferably have maximum lengths of 1/16 inch and maximum diameters of 30 microns. These fibers are used in an amount of from 0 to 10%.

Polydimethyl siloxane is employed in an amount of 0.4 to 1.5%.

The polyamido amine agent is preferably employed in an amount of from 4 to 11%. The aliphatic amine curing agent is preferably employed in an amount of from 0 to 3%. These well known amines contain two or more reactive hydrogen groups and amine terminated polyamide compositions, such as those formed through the condensation of unsaturated fatty acids with $C_2$–$C_{10}$ aliphatic polyamines having at least three amino groups per molecule. Representative examples of useful amine-type curing agents include triethylene tetramine, m-phenylenediamine, 3-diethylamino-1-propylamine, condensates of unsaturated fatty acids with diethylene triamine or triethylene tetramine (sold as Versamid 100, 115 and 125 resins), 3-isopropylamino propylamine, 1,3-diamino propane, 1,2-diamino propane, ethylene diamine, m-xylene diamine, 3,3'-iminobispropylamine, tetraethylene pentamine, etc.

The amine selection is based on the speed of setting desired. The second provides a faster cure, sometimes desirable on vertical surfaces in hot environments.

Inert diluents such as talc can be added as desired to provide greater viscosity when desired.

The ingredients excluding the curing agents are thoroughly admixed at a temperature of above 70° F. employing a stirrer, agitator, etc. The curing agent is then thoroughly admixed at the site.

The compositions with the curing agent is then painted on by a brush or roller leaving a film approximately 0.015 inches thick. They can also be applied with a trowel or smoothed therewith after using the brush or roller. They can also be sprayed on using high pressure equipment. After application, a light sanding or abrasion of the surface of the clad is performed to expose the copper to the environment. A clad having compositions of this invention, has a minimum electrical resistivity of $1\times10^6$ ohms cm. as tested on the abraded surface. The resistance is very important in the prevention of galvanic corrosion of less noble metals used in the fabrication of the clad structure.

All percentages as used herein are by weight based on the total composition, unless stated to the contrary, free of diluents or carrier.

This invention will be better understood by reference to the following examples:

EXAMPLE 1

A mixture of
1 part by weight of Ciba Geigy Araldite GY 6005 (b1)
0.5 part by weight of Ciba Geigy Araldite GY 508 (b2)
0.85 part by weight of Ciba Geigy Araldite HY 283 (e1)
5.35 part by weight of SCM Copper Powder 200 RL
0.58 part by weight of milled fiberglass 0.8 mm length 0.055 part by weight of Dow-Corning Polydimenthyl Siloxane 200 50 cs.

was applied to a section of inlet pipe in a utility plant. The pipe adjacent to the clad section collected in excess of three inches of barnacles in three months; no growth was observed on the clad section. A panel was coated with the clad and allowed to cure for seven days in an ambient temperature varying from about 68°–85° F. The resistivity of the clad was then measured and found to be greater than $1\times10^6$ ohm cm.

EXAMPLE 2

Other panels and vessels are coated with the compositions of this invention and provide similar dramatic improvement.

Instead of glass fibers, fibers of other materials having similar properties can be employed.

It is to be understood that this invention is not limited to the specific examples which have been offered as particular embodiments and that modifications can be made without departing from the spirit thereof.

I claim:

1. A marine cladding composition, comprising in combination:

|   |   | TOTAL WEIGHT % |
|---|---|---|
| a. | Copper powder | 40–80 |
| b. | Two epoxy resins | |
|   | 1. Bisphenol A epoxy resin | 9–15 |
|   | and | |
|   | 2. Polyglycol di-epoxide | 4–8 |
| c. | Glass fibers | 0–10 |
| d. | Polydimethyl siloxane | 0.4–1.5 |
| e. | Two amine curing agents | |
|   | 1. A polyamido amine | 4–11 |
|   | and | |
|   | 2. An aliphatic amine | 0–3 | which after application to a marine substrate has a minimum electrical resistance of $1\times10^6$ ohm cm.

2. The composition of claim 1 having the composition:

|   | Relative Parts by Total Weight |
|---|---|
| Copper powder | 5.35 |
| Bisphenol A epoxy resin | 1 |
| Polyglycol di-epoxide | 0.5 |
| Glass fibers | 0.58 |
| Polydimethyl siloxane | 0.055 |
| A Polyamido Amine | 0.85 |

3. The composition of claim 1, wherein said glass fibers are further described as having maximum lengths of 1/16-inch and maximum diameters of 30 microns each.

* * * * *

UNITED STATES PATENT AND TRADEMARK OFFICE
CERTIFICATE OF CORRECTION

PATENT NO. : 5,760,103
DATED      : June 2, 1998
INVENTOR(S): Joseph M. Wentzell It is certified that error appears in the above-identified patent and that said Letters Patent is hereby corrected as shown below:

In claim 1, column 4, line 14, "resistance" should read -- resistivity --.

Signed and Sealed this

Fifth Day of January, 1999

Attest:

Attesting Officer

*Acting Commissioner of Patents and Trademarks*